United States Patent [19]
Yoshida et al.

[11] Patent Number: 5,257,114
[45] Date of Patent: Oct. 26, 1993

[54] IMAGE COMMUNICATION APPARATUS WITH ROLLED RECORD SHEET CUTTER

[75] Inventors: Takehiro Yoshida, Tokyo; Satoshi Wada, Atsugi, both of Japan

[73] Assignee: Canon Kabushiki Kaisha, Tokyo, Japan

[21] Appl. No.: 695,401

[22] Filed: May 3, 1991

[30] Foreign Application Priority Data

May 10, 1990 [JP] Japan .................................. 2-118669

[51] Int. Cl.⁵ ............................................. H04N 1/40
[52] U.S. Cl. ................................. 358/448; 358/449; 358/304; 358/296
[58] Field of Search ............... 358/304, 449, 434, 436, 358/296, 448

[56] References Cited

U.S. PATENT DOCUMENTS

| | | | |
|---|---|---|---|
| 3,585,289 | 6/1971 | Huber et al. | 358/304 |
| 4,631,596 | 12/1986 | Yaguchi | 358/256 |
| 4,679,093 | 7/1987 | Yaguchi | 358/257 |
| 4,712,139 | 12/1987 | Kato | 358/257 |
| 4,717,967 | 1/1988 | Yoshida | 358/296 |
| 4,885,641 | 12/1989 | Kato | 358/296 |
| 5,068,743 | 11/1991 | Araki et al. | 358/304 |
| 5,072,306 | 12/1991 | Matsumoto et al. | 358/304 |
| 5,140,430 | 8/1992 | Horii et al. | 358/449 |

FOREIGN PATENT DOCUMENTS

55-99875  7/1980  Japan .

Primary Examiner—Edward L. Coles, Sr.
Assistant Examiner—Fan Lee
Attorney, Agent, or Firm—Fitzpatrick, Cella, Harper & Scinto

[57] ABSTRACT

An image communication apparatus comprises a cutter for cutting a record sheet, a detector for detecting a length of a received image, a setter for setting a length for a predetermined size and a controller for comparing the length for the predetermined size and the length of the received image and controlling the cutter such that the record sheet is cut to the predetermined size when the length of the received image is substantially equal to the length of the predetermined size and cutting the record sheet to a non-predetermined size when both lengths are different.

13 Claims, 8 Drawing Sheets

IMAGE COMMUNICATION APPARATUS WITH ROLLED RECORD SHEET CUTTER

BACKGROUND OF THE INVENTION

1. Field of the Invention

The present invention relates to an image communication apparatus, and more particularly to an image communication apparatus which uses a rolled record sheet to output an input image and cut the record sheet into a predetermined size by record sheet cutting means after the outputting of one page of record.

2. Related Background Art

A facsimile apparatus which cuts a rolled sheet into a predetermined size has been known.

In such an apparatus, a predetermined paper size which corresponds to a size of the rolled sheet in a scan direction (width direction) is assumed as a size of an output document.

As to a sub-scan direction, a predetermined size is always used regardless of a record length.

It is now assumed that a user loads a rolled record sheet having a main scan direction width of 210 mm, that is, a size A4 width, and frequently receives sales slips of a size A5 which has one half width of the size A4 width.

In the prior art apparatus, a record length in the sub-scan direction is 210 mm but the record sheet is cut into 297 mm length (length of the size A4 sheet in the sub-scan direction). This wastes the record sheet.

In order to avoid the above problem, where a record sheet having a main scan direction width of 210 mm is loaded, a size of a received image may be detected and the record sheet may be cut into a predetermined size having the width equal to the record sheet width only when the record length in the sub-scan direction is substantially equal to 210 mm or 297 mm.

However, depending on a user, the sales slip of the size A5 may be transmitted with a 90-degree rotated position.

In this case, the record length in the sub-scan direction is one half of that of the size A4, that is, 148 mm. In order to process it, with a record sheet having a main scan direction width of 210 mm, it is necessary to cut the record sheet into a predetermined size when the record length in the sub-scan direction is substantially equal to 148 mm or 297 mm.

Thus, where the rolled record sheet is used, there are various problems to be solved when a proper size to cut the record sheet is determined.

SUMMARY OF THE INVENTION

In the light of the above, it is an object of the present invention to improve an image communication apparatus.

It is another object of the present invention to provide an image communication apparatus which can cut a rolled record sheet into a proper size when an image is recorded on the rolled sheet.

It is another object of the present invention to provide an image communication apparatus which cuts a rolled sheet into a predetermined size or a desired size in accordance with an image to be recorded.

It is another object of the present invention to provide an image communication apparatus which determines whether a received image length is substantially equal to a length of a predetermined size, and cuts the record sheet into the predetermined size or other desired size depending on the determination result.

Other objects of the present invention will be apparent from the following detailed description of the embodiments and the drawings.

BRIEF DESCRIPTION OF THE DRAWINGS

FIGS. 2A1–2A7, 2B, 2C1, 2C2, 2D1 and 2D2 show flow charts of a control operation of the embodiment.

DETAILED DESCRIPTION OF THE PREFERRED EMBODIMENTS

The present invention is now explained in detail for one embodiment shown in the drawings.

Figure 1:
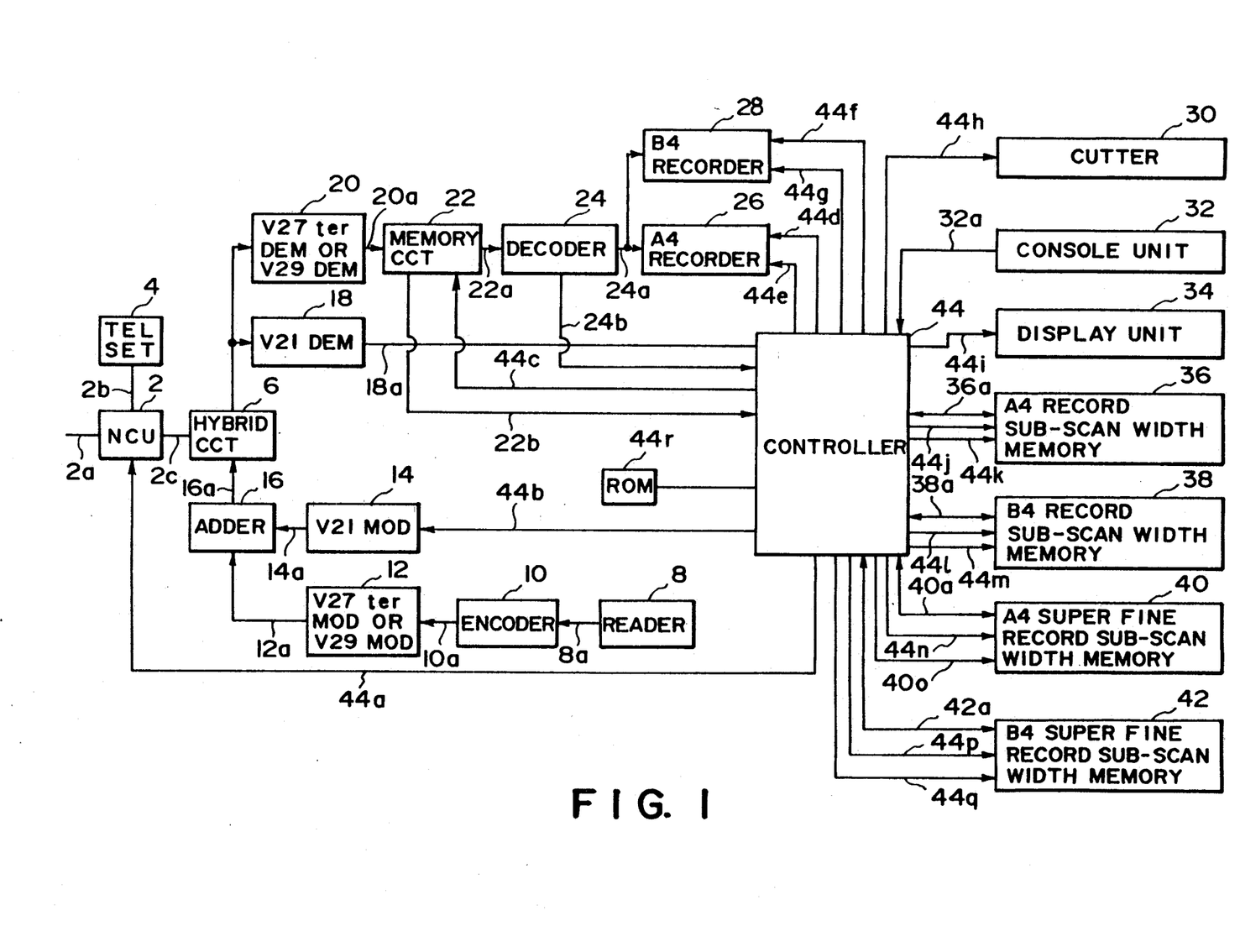
FIG. 1 shows a block diagram of a facsimile apparatus in accordance with one embodiment.

FIG. 1 shows a block diagram of a facsimile apparatus in accordance with the present embodiment.

In FIG. 1, numeral 2 denotes a network control unit (NCU) which is connected to a terminal of a line to control the connection of a telephone switching network in order to use a telephone network for data communication, switches the line to the data communication or holds a loop. A signal line 2a is a telephone line.

The NCU 2 receives a signal on a signal line 44a, and if a signal level thereof is "0", it connects the telephone line to a telephone set 4, that is, it connects the signal line 2a to a signal line 2b. If the signal level of the signal on the signal line 44a is "1", it connects the telephone line to a facsimile apparatus, that is, it connects the signal line 2a to a signal line 2c. In a normal state, the telephone line is connected to the telephone set 4.

Numeral 6 denotes a hybrid circuit which separates signals in a transmission system from signals in a receiving system. A transmission signal on a signal line 16a is sent out to the telephone line through the signal line 2c and the NCU 2. A signal sent from a sending station is supplied to a signal line 6a through the NCU 2 and the signal line 2c.

Numeral 8 denotes a reader which sequentially reads one-line image signals of a transmitting document along a main scan direction to produce binary black and white signal sequences. It may comprise an imaging device such as a charge coupled device (CCD) and an optical system. The binary black and white signal sequences are supplied to a signal line 8a.

Numeral 10 denotes an encoder which receives the data on the signal line 8a and supplies an MH (modified Hoffmann) coded or MR (modified Reed) coded data to a signal line 10a.

Numeral 12 denotes a modulator which modulates in accordance with the CCITT Recommendation V27 ter (differential phase modulation) or V29 (quadrature modulation). The modulator 12 receives the signal on the signal line 10a, modulates it and supplies the modulated data to a signal line 12a.

Numeral 14 denotes a modulator which modulates in accordance with the CCITT Recommendation V21. The modulator 14 receives a protocol signal on a signal line 44b, modulates it and supplies the modulated data to a signal line 14a.

Numeral 16 denotes an adder which receives the signals on the signal lines 12a and 14a and supplies a sum to a signal line 16a.

A numeral 18 denotes a demodulator which demodulates in accordance with the CCITT Recommendation V21. The demodulator 18 receives the signal on the signal line 6a, demodulates it in accordance with V21 and supplies the demodulated data to a signal line 18a.

Numeral 20 denotes a demodulator which demodulates in accordance with the CCITT Recommendation V27 ter (differential phase modulation) or V29 (quadrature modulation). The demodulator 20 receives the signal on the signal line 6a, demodulates it and supplies the demodulated data to a signal line 20a.

Numeral 22 denotes a memory, the writing and reading of which are controlled via a signal line 44c. The memory 22 generates one pulse on a signal line 22b when it stores one line of information.

Numeral 24 denotes a decoder which receives the data on the signal line 22a and supplies an MH (modified Hoffmann) decoded or MR (modified Reed) decoded data to a signal line 24d. The decoder 24 generates one pulse on a signal line 24b after the output of one line of record information to the signal line 24a, that is, after recording of one line.

Numeral 26 denotes a recorder which records on a record sheet having a size A4 width in a main scan direction. When a signal level of a signal on a signal line 44d is "1", it receives the data on the signal line 24a and records it sequentially line by line. When the signal level of the signal on the signal line 44d is "0", no recording is effected. Each time the recorder 26 supplies a pulse to a signal line 44e, it feeds the rolled sheet by a feed unit of a super fine mode, that is, 1/15.4 mm.

Numeral 28 denotes a recorder which records on a record sheet having a size B4 width in the main scan direction. When a signal level of a signal on a signal line 44f is "1", it receives the data on the signal line 24a and records it sequentially line by line. When the signal level of the signal on the signal line 44f is "0", no recording is effected. Each time the recorder 28 supplies a pulse to a signal line 44g, it feeds the rolled sheet by a feed unit in the super fine mode, that is, 1/15.4 mm.

Numeral 30 denotes a cutter which cuts the rolled sheet when a pulse is supplied to a signal line 44h.

Numeral 32 denotes a console unit. Depression information (ten-key information, function keys and registration keys) is supplied to a signal line 32a.

Numeral 34 denotes a display for displaying data on a signal line 44i.

Numeral 36 denotes a memory which stores up to five sub-scan direction lengths based on which determination is made as to a predetermined size sheet with respect to the size A4 in the main scan direction. In order to store in the memory 36, an address n (n=01-05) is supplied to a signal line 36a and then three digits (for example 297) which represents the length in mm are supplied, and a write pulse is sent to a signal line 44j. In this manner, "297" is stored at the address n (for example 01). When "02:210" is supplied to the signal line 36a and then a write pulse is sent to the signal line 44j, "210" is stored at the address 02. When the data stored in the memory 36 is to be read, an address n (for example 02) is sent to the signal line 36a and then a read pulse is sent to a signal line 44k. In this manner, "210" is outputted on the signal line 36a.

Numeral 38 denotes a memory which stores up to five sub-scan direction lengths based on which determination is made as to a predetermined size sheet with respect to the size B4 in the main scan direction, in the same format as that of the memory 36. When the data is to be recorded in the memory 38, "n (for example 01): abc (for example 364)" is sent to a signal line 38a and a write pulse is sent to a signal line 44e. In this manner, "364" is stored at the address n (for example 01). When the data stored in the memory 38 is to be read, the address n (for example 01) is sent to the signal line 38a and then a read pulse is sent to a signal line 44n. In this manner, "364" is outputted on the signal line 38a.

Numeral 40 denotes a memory which converts the sub-scan direction lengths stored in the memory 36 for use as the base to determine as to the predetermined size with respect to the size A4 in the main scan direction to the numbers of lines in the super fine mode and stores them in the addresses 01, 02, 03, 04 and 05 in the ascending order of the number of lines. By multiplying the length stored in the memory 36 by a factor of 15.4, the number of lines in the super fine mode is determined. In order to store the data in the memory 40, "n (for example 01): 457" is sent to a signal line 40a and then a write pulse is sent to a signal line 44n. In order to read the data stored in the memory 40, the address n (for example 01) is sent to the signal line 40a and then a read pulse is sent to a signal line 440. In this manner, "4574" (lines) is outputted on the signal line 40a.

Numeral 42 denotes a memory which converts the sub-scan direction lengths stored in the memory 38 for use as the base to determine as to the predetermined size with respect to the size B4 in the main scan direction to the numbers of lines in the super fine mode and stores them at the addresses 01, 02, 03, 04 and 05 in the ascending order of the number of lines. By multiplying the length stored in the memory 38 by a factor of 15.4 the number of lines in the super fine mode is determined.

When the data is to be stored in the memory 42, "n (for example 01): 5606" is sent to a signal line 42a and then a write pulse is sent to a signal line 44p. When the data stored in the memory 42 is to be read, n (for example 01) is sent to the signal line 42a and then a read pulse is sent to a signal line 44q. In this manner, "5606" is outputted on the signal line 42a.

Numeral 44 denotes a controller which comprises a microprocessor to control the receiving operation as outline below.

In the apparatus of FIG. 1, two rolled sheets such as a size A4 and a size B4 can be set in the recorders 26 and 28, respectively (this is referred to as "double roll" hereinafter).

The sub-scan direction length based on which the determination is made as to the predetermined size with respect to the size A4 in the main scan direction is directly entered from the console unit 32. The input is up to three digits in mm unit. In the present embodiment, up to five sub-scan direction lengths may be set.

The sub-scan direction length based on which the determination is made as to the predetermined size with respect to the size B4 in the main scan direction is also directly entered from the console unit. The input is up to three digits in mm unit. In the present embodiment, up to five sub-scan direction lengths may be set.

When a receive mode is selected and if both the B4 rolled sheet and the A4 rolled sheet have been loaded, an initial identification signal (DIS signal) which indicates that the reception in the size B4 is ready is sent out.

If the main scan direction length of the apparatus at the sending station is the size B4, the received data is recorded on the size B4 rolled sheet, and the rolled sheet is cut to the predetermined size if the sub-scan direction length of the received image is substantially equal to (for example, within an error of ±1 cm) the sub-scan direction length based on which the determination is made as to the predetermined size with respect to the size B4 in the main scan direction. When the sub-scan direction length of the received image is other than the above length, the rolled sheet is cut at a timing of the reception of an end of page signal.

When the main scan direction length of the apparatus at the sending station is the size A4, the image is recorded on the size A4 rolled sheet, and the rolled sheet is cut to the predetermined size when the sub-scan direction length of the received image is substantially equal to (for example, within an error of ±1 cm) the sub-scan direction length based on which the determination is made as to the predetermined size with respect to the size A4 in the main scan direction. When the sub-scan direction length of the received image is other than the above length, the rolled sheet is cut at a timing of the reception of the end of page signal.

When the receive mode is selected and if only the size B4 rolled sheet has been loaded, an initial identification signal (DIS signal) which indicates that the reception in the size B4 is ready is sent out. When the main scan direction length of the apparatus at the sending station is the seize B4, the received image is recorded on the size B4 rolled sheet, and the rolled sheet is cut to the predetermined size when the sub-scan direction length of the received data is substantially equal to the sub-scan direction length based on which the determination is made as to the predetermined size with respect to the size B4 in the main scan direction. When the sub-scan direction length of the received data is other than the above length, the rolled sheet is cut at the timing of the reception of the end of page signal.

When the main scan direction length of the apparatus at the sending station is the size A4, the received data is recorded on the size B4 rolled sheet, and the rolled sheet is cut to the predetermined size when the sub-scan direction length of the received image is substantially equal to the sub-scan direction length based on which the determination is made as to the predetermined size with respect to the size A4 in the main scan direction. When the sub-scan direction length of the received image is other than the above length, the rolled sheet is cut at the timing of the reception of the end of page signal.

When the receive mode is selected and if only the size A4 rolled sheet has been set, the initial identification signal (DIS signal) which indicates that the reception in the size A4 is ready is sent out. The main scan direction length of the apparatus at the sending station is the size A4 in the transmission mode, and the received data is recorded on the size A4 rolled sheet. The rolled sheet is cut to the predetermined size when the sub-scan direction length of the received image is substantially equal to the sub-scan direction length based on which the determination is made as to the predetermined size with respect to the size A4 in the main scan direction. When the sub-scan direction length of the received data is other than the above length, the rolled sheet is cut at the timing of the reception of the end of page signal.

FIGS. 2A-2D show a flow of control of the controller 44 to attain the above control. The procedure shown is stored in a ROM 44r as a program for the controller 44.

Figure 2A:
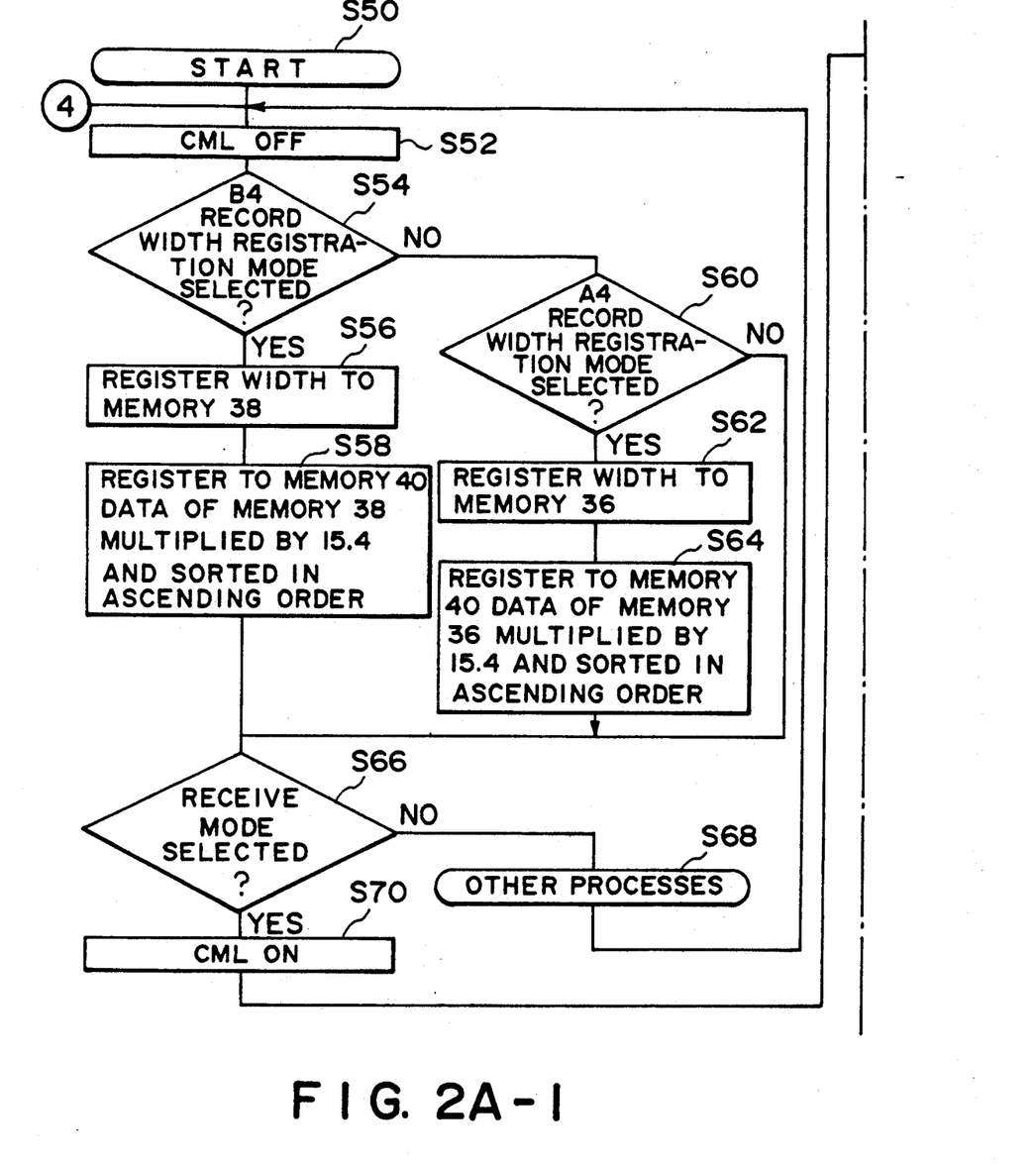

In FIG. 2A-1, a step S50 indicates a start.

In a step S52, a signal having a signal level "0" is supplied to the signal line 44a, a CML relay is deactuated and the line is connected to the telephone set 4.

In a step S54, whether a registration mode for the sub-scan direction length based on which the determination is made as to the predetermined size with respect to the size B4 in the main scan direction is selected or not is determined. If the registration mode is selected, the sub-scan direction lengths are stored in the size B4 record length memory 38 in a step S56.

In a step S58, the registered lengths are multiplied by the factor of 15.4 to produce the numbers of lines in the super fine mode, which are stored in the size B4, super fine mode record length memory 42 at the addresses 01, 02, 03, 04 and 05 in the ascending order of the number of lines. If the registration mode in the size B4 is not selected in the step S54, the process proceeds to a step S60.

In the step S60, whether the registration mode for the sub-scan direction length based on which the determination is made as to the predetermined size with respect to the size A4 in the main scan direction is selected or not is determined. If the registration mode is selected, the sub-scan direction lengths are stored in the size A4 record length memory 36 in a step S62.

In a step S64, the registered lengths are multiplied by the factor of 15.4 to produce the numbers of lines in the super fine modes, and they are stored in the size A4 super fine mode record length memory 40 at the addresses 01, 02, 03, 04 and 05 in the ascending order of the number of lines. If the size A4 registration mode is not selected in the step S60, the process proceeds to a step S66.

In the step S66, whether the receive mode is selected or not is determined in accordance with the operation state of the console unit 32 or the call from the line.

When the receive mode is selected, the process proceeds to a step S70, and when the receive mode is not selected, the process proceeds to a step S68 to carry out other process.

In the step S70, a signal having the signal level "1" is sent to the signal line 44a and the CML is actuated.

Figures 2A, 2A:
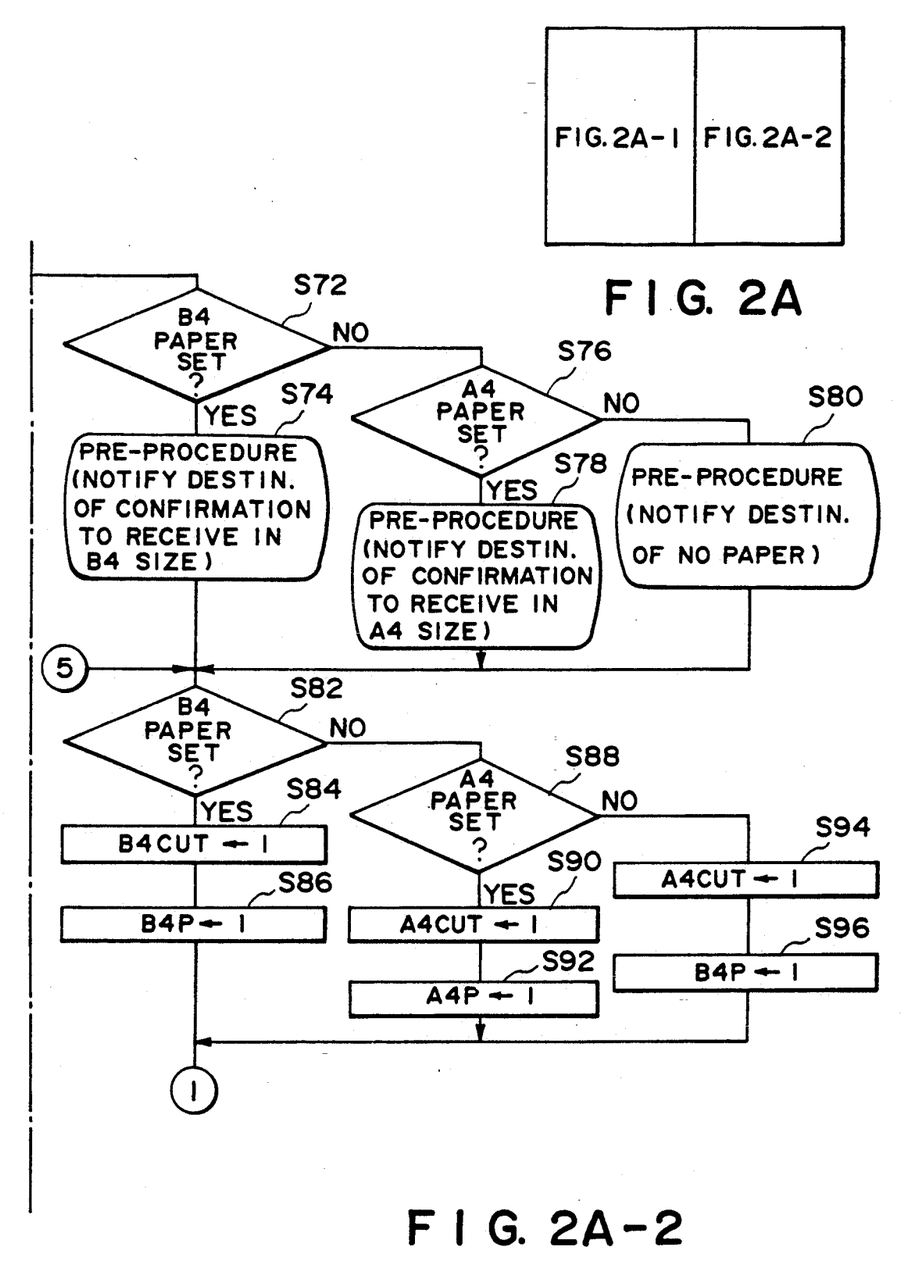

In a step S72, whether the size B4 record sheet (size B4 rolled sheet) is present or not is determined. If it is, the process proceeds to a step S74 to inform to the sending station that the reception in the size B4 is ready, in a pre-procedure. If the size B4 record sheet is not present, the process proceeds to a step S76.

In the step S76, whether the size A4 record sheet (size A4 rolled sheet) is present or not is determined. If it is present, the process proceeds to a step S78 to inform, in the pre-procedure, to the apparatus in the sending station that the reception in the size A4 is ready. If the size A4 record sheet is not present, the process proceeds to a step S80 to inform, in the pre-procedure, to the apparatus at the sending station that there is no record sheet.

In a step S82, whether the transmission size (the main scan direction size of the image to be received) is the size B4 or not is determined. If the transmission size is the size B4, the process proceeds to a step S84 to set a flag B4CUT to "1" in order to indicate that the determination is made as to the predetermined size with respect to the size B4 in the main scan direction.

In a step S86, a signal having the signal level "0" is sent to the signal line 44d and a signal having the signal level "1" is sent to the signal line 44f to select the recording to the size B4 record sheet. If the transmission size is not the size B4, the process proceeds to a step S88.

The process proceeds to the step S88 when the transmission size is the size A4. In the step S88, whether the size A4 record sheet is present or not is determined. If it is present, the process proceeds to a step S90 to set a flag A4CUT to "1" in order to indicate that the determination is made as to the predetermined size with respect to the size A4 in the main scan direction.

In a step S92, a signal having the signal level "1" is sent to the signal line 44d and a signal having the signal level "0" is sent to the signal line 44f to select the recording to the size A4 record sheet. If the size A4 record sheet is not present, the process proceeds to a step S94.

In the step S94, the flag A4CUT is set to "1" in order to indicate that the determination is made as to the predetermined size with respect to the size A4 in the main scan direction. In a step S96, a signal having the signal level "0" is sent to the signal line 44d and a signal having the signal level "1" is sent to the signal line 44f to select the recording to the size A4 record sheet.

Figure 2B:
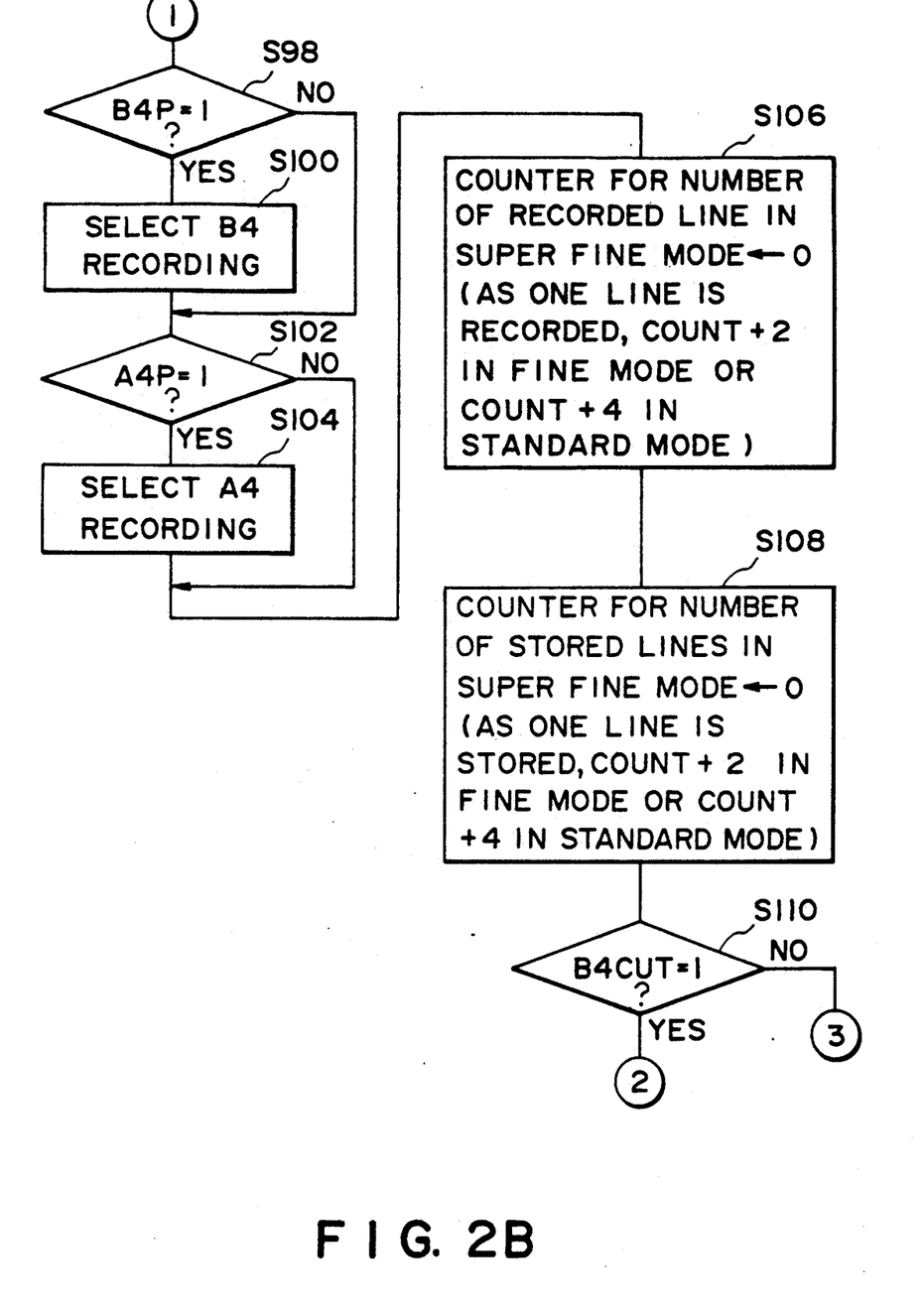

In steps S98 to S104 of FIG. 2B, if a flag B4P is "1", the recording to the size B4 record sheet is selected, and if a flag A4P is "1", the recording to the size A4 record sheet is selected.

In a step S106, the number of record counter in the super fine mode is reset to "0". The counter counts the number of record lines in the super fine mode. In the fine mode, the count is incremented by two when one line is recorded, and in the standard mode, the count is incremented by four when one line is recorded.

Figure 2C:
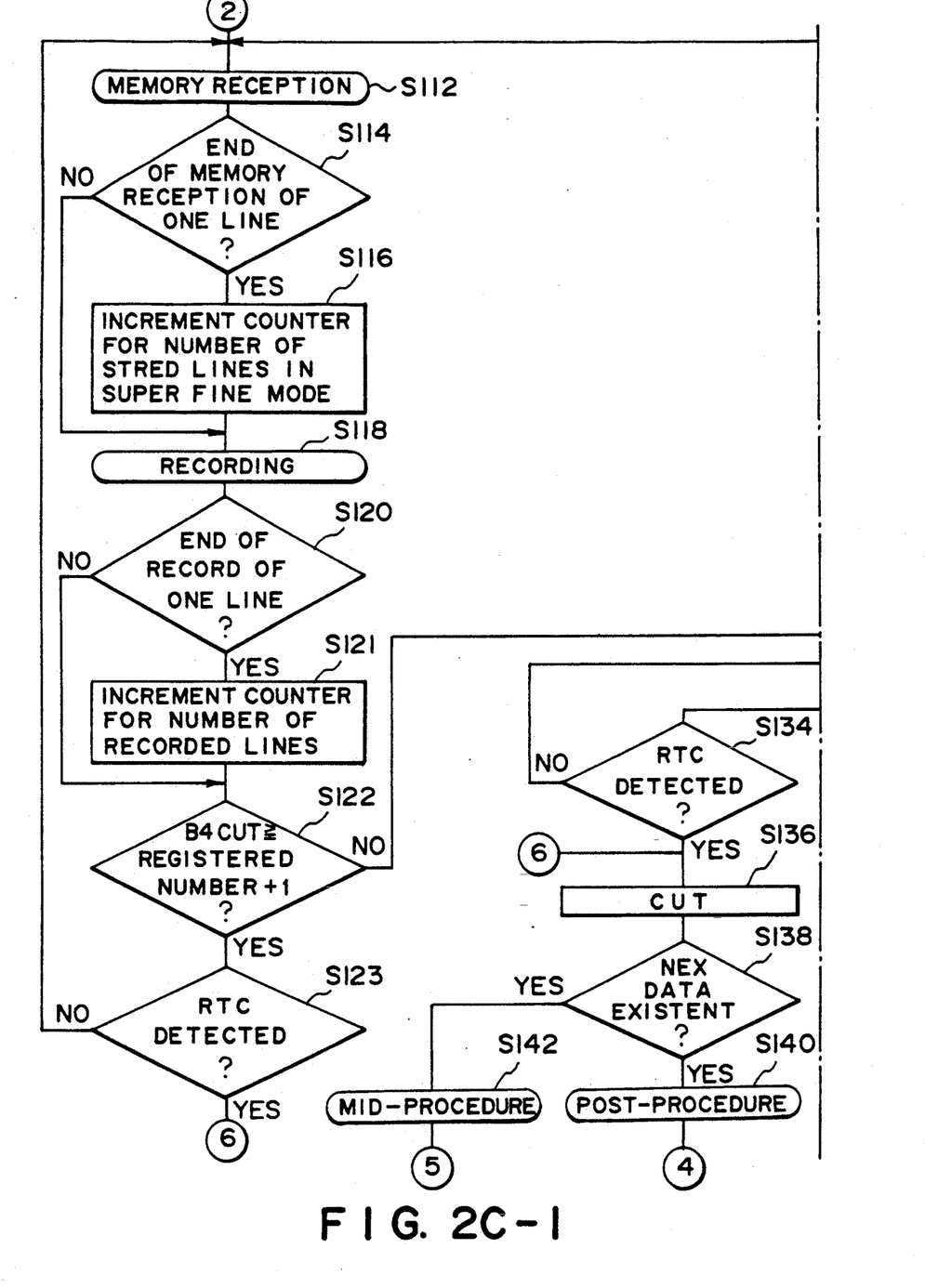

In a step S108, the counter for the number of lines in the super fine mode stored in the memory is reset to "0". The counter counts the number of record lines in the super fine mode. In the fine mode, the count is incremented by two when one line is recorded, and in the standard mode, the count is incremented by four when one line is recorded. In a step S110, whether the determination is made as to the predetermined size with respect to the size B4 in the main scan direction is determined. When the flag B4CUT is "1", that is, when the determination is to be made as to the predetermined size with respect to the size B4 in the main scan direction, the process proceeds to a step S112 of FIG. 2C-1, and when the flag B4CUT is "0" (and the flag A4CUT is "1"), that is when the determination is to be made as to the predetermined size with respect to the size A4 in the main scan direction, the process proceeds to a step S152.

In the step S112 of FIG. 2C-1, the data is written into the memory.

In a step S114, a signal on the signal line 22b is checked to determine whether one line of data has been written into the memory. When one line of data has been written, the counter for the number of lines in the super fine mode is incremented (by one in the super fine mode, by two in the fine mode, and by four in the standard mode) in a step S116. If one line of data has not been written into the memory, the process proceeds to a step S118.

In the step S118, the recording is carried out.

In a step S120, the signal on the signal line 24b is checked to determine whether one line of data has been recorded or not. If one line of data has been written into the memory, the counter for the number of record lines in the super fine mode is incremented in a step S121. If one line of data has not been written into the memory, the process proceeds to a step S124.

In a step S122, whether the flag B4CUT is larger than the registered number plus one or not is determined. If the flag B4CUT is larger than the registered number plus one, the process proceeds to a step S123, an if the flag B4CUT is no larger than the registered number plus one, the process proceeds to a step S124. In the step S123, whether the RTC signal has been detected or not is determined, an if it has been detected, the process proceeds to a step S112.

In the step S124, whether the count of the counter for the number of record liens in the super fine mode has reached a count which is displaced from a small value stored in the memory by the value of B4CUT is determined. If the count has not reached that value, the process proceeds to a step S146, and if the count has reached that value, the process proceeds to a step S126.

Figures 2C, 2C:
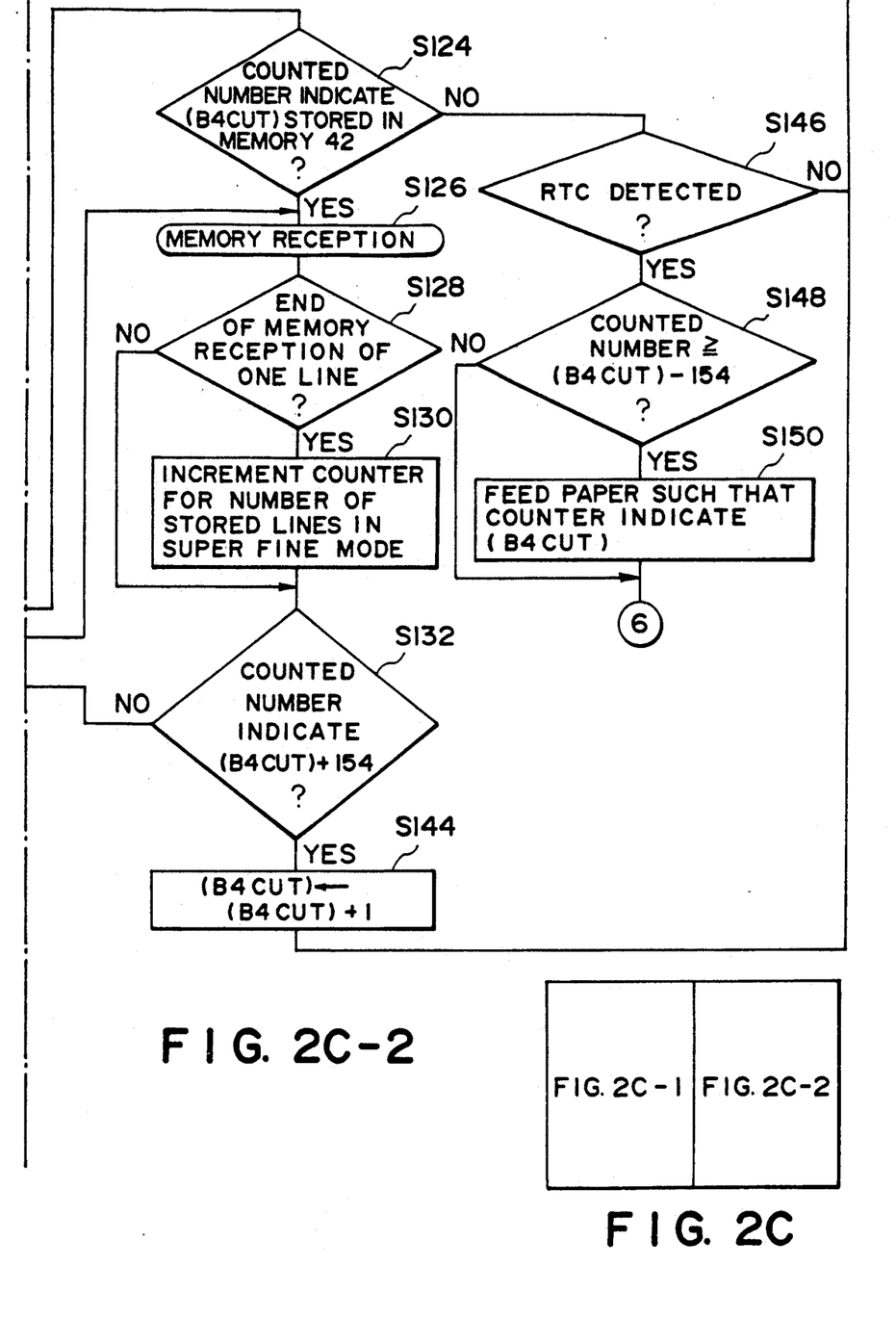

In the step S126, data is written into the memory through the signal line 44c.

In the step S128, the signal on the signal line 22b is checked to determine whether one line of data has been written into the memory or not. If one line of data has been written, the counter for the number of lines stored in the memory in the super fine mode is incremented in a step S130. If one line of data has not been written, the process proceeds to a step S132.

In the step S132, whether the count of the counter for the number of lines stored in the memory in the super fine mode has reached a value displaced from a small value stored in the memory by the content of B4CUT, plus 154 or not is determined. If the count has reached that value, the process proceeds to a step S144 and the content of the flag B4CUT is incremented by one. If the count has not reached that value, the process proceeds to a step S134.

In the step S134, whether the RTS signal has been detected or not is determined.

When the RTC signal is detected, the process proceeds to a step S136, and when the RTC signal is not detected, the process proceeds to a step S126.

In a step S136, a pulse is sent to the signal line 44h to start the cutting.

In a step S138, whether next information is present or not is determined. If the next information is present, the process proceeds to a step S142 to carry out an intermediate procedure, and if the next information si not present, the process proceeds to a step S140 to carry out the post-procedure.

In a step S146, whether the RTC signal has been detected or not is determined. If the RTC signal has been detected, the process proceeds to a step S148, and if the RTC signal has not been detected, the process proceeds to the step S112.

In a step S148, whether the count of the counter for the number of record liens in the super fine mode has reached a value displaced from a small count stored in the memory 42 by the count of B4CUT, minus 154 or not is determined. If the count has reached that value, the process proceeds to a step S150, and if it has not, the process proceeds to a step S136.

In a step S150, pulses are sent to the signal line 44g to increment the count of the counter for the number of record lines in the super fine mode to the value displaced from the small value stored in the memory 42 by the count of B4CUT, in order to feed the record sheet.

Figure 2D:
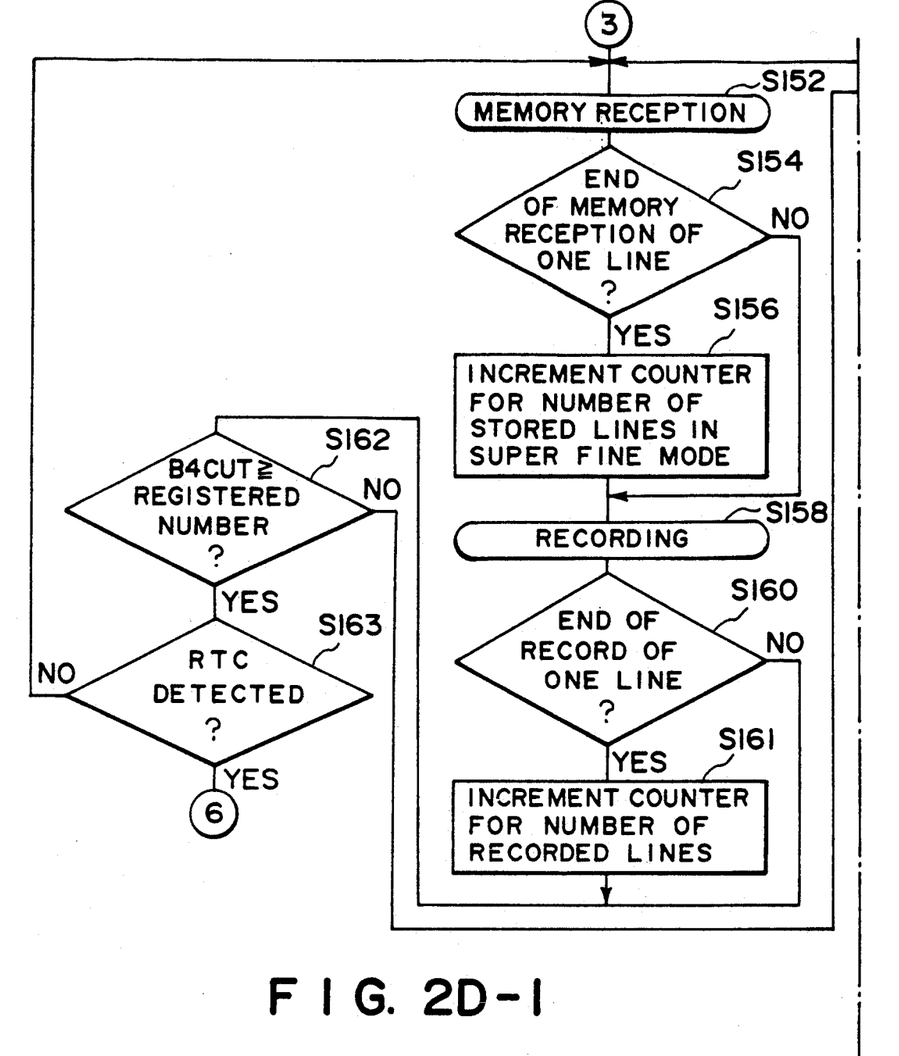
Figure 2D:
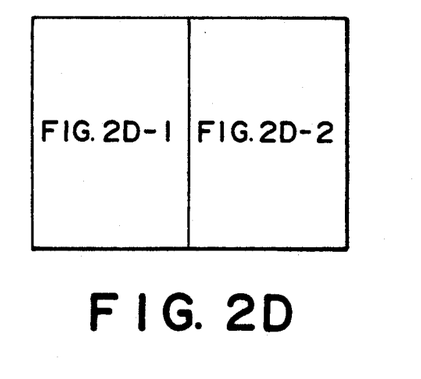
Figure 2D:
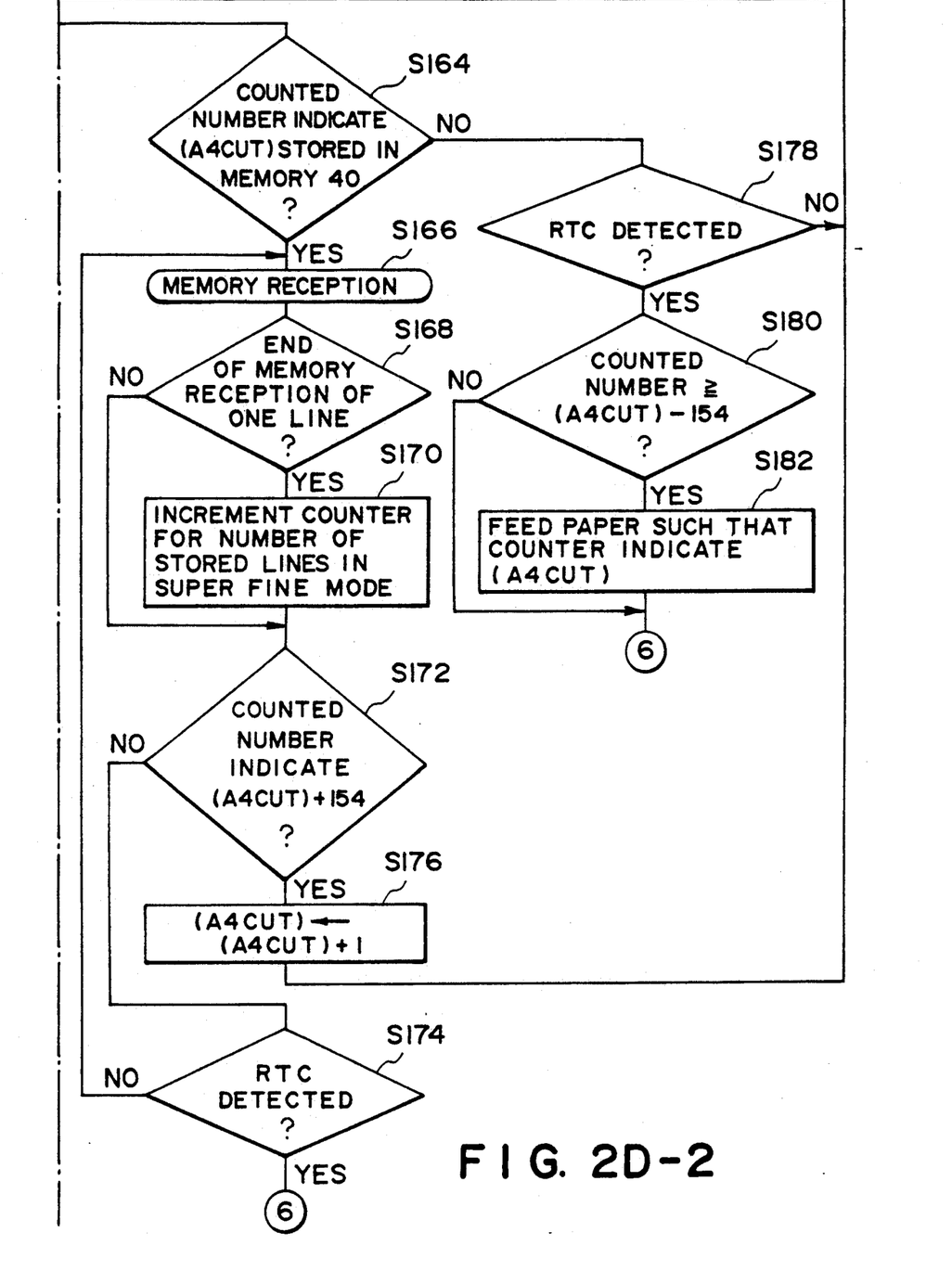

In a process in and after a step S152 of FIG. 2D-1, the flag A4CUT is used in place of the flag B4CUT in the steps S112–S150 for the determination as to the predetermined size with respect to the size A4 in the main scan direction. The data from the memory 40 instead of the memory 42 is used.

Except for the above differences, the process of FIGS. 2D-1 and 2D-2 is identical to the process of FIGS. 2C-1 and 2C-2 and detailed description thereof is omitted.

In the present embodiment, means for allowing a user to enter the sub-scan direction length is provided in the facsimile machine which records data on the rolled sheet. Thus, when the record length is substantially equal to the length of the predetermined size, the rolled sheet is cut to the predetermined size, and when the record length is not equal to the length of the predetermined size, the rolled sheet is cut to a non-predetermined size.

In order to input the sub-scan direction length based on which the determination is made as to the predetermined size, at least one sub-scan direction length may be directly entered, or at least one selected from a plurality of sub-scan direction lengths based on which the determination is made as the predetermined size may be entered.

Where rolled sheets of a plurality of record sheet sizes (for example rolled sheets having lengths of 210 mm and 257 mm in the main scan direction, which correspond to the size A4 and size B5 rolled sheets, respectively) can be loaded, the sub-scan direction lengths based on which the determination is made as to the predetermined size are entered for each of the record sheet sizes, and when the record length is substantially equal to the sub-scan direction length, the rolled sheet is cut to the predetermined size.

Thus, the user can set desired predetermined sizes.

In the above embodiment, "double roll" is employed so that two size rolled sheets such as the size A4 and the size B4 can be loaded together.

Also the above embodiment, the controller is directed to "double roll". But the present invention is also applicable to a facsimile apparatus in which either the size A4 rolled sheet or the size B4 rolled sheet is selectively loaded.

In this case, when the size A4 rolled sheet is loaded, the control may be carried out which is executed where only the size A4 rolled sheet is loaded in the above embodiment. Also, when the size B4 rolled sheet is loaded, the control may be effected which is executed where only the size A4 rolled sheet is loaded in the above embodiment.

Further, when only the B4 rolled sheet is landed in the reception mode in the above embodiment, the received data is recorded on the B4 rolled sheet if the main scan direction length of the apparatus at the sending station is the size A4 which the rolled sheet is cut to the predetermined size if the subscan direction length of the received image is substantially equal tot he sub-scan direction length based on which the determination is made as to the predetermined size with respect to the size A4 in the main direction. When the sub-scan direction length of the received image is other than the above length, the rolled sheet is cut at a timing of the reception of an end-of-page signal.

However, if the sub-scan direction length of the received image is substantially equal to the sub-scan direction length based on which the determination is made as to the predetermined size with respect to the size B4 in the main direction, the rolled paper may be cut to the predetermined size, and if other than the above length, the rolled sheet may be cut at a timing of the reception of an end-of-page signal.

The present invention is not limited to the foregoing embodiment but is subject to various modifications.

We claim:

1. An image communication apparatus comprising:
   means for recording an image on a rolled record sheet;
   means for cutting said record sheet;
   means for detecting a length of a received image;
   means for setting a length for a predetermined size; and
   control means for comparing the length for the predetermined size set by said setting means and the length of the received image detected by said detection means to control said cutting means in accordance with the comparison results
   wherein said control means cuts said record sheet to the predetermined size when the length of the received image is substantially equal to the length for the predetermined size and cuts the record sheet to a non-predetermined size having the length determined by the length detected by said detection means when the length of said detection means and the length for the predetermined size are different.

2. An image communication apparatus according to claim 1 wherein said control means cuts the record sheet to the length of the predetermined size when the length of the received image is longer than the length of the predetermined size minus a preset value and shorter than the length of the predetermined size plus said preset value.

3. An image communication apparatus according to claim 2 wherein said control means cuts the record sheet to the non-predetermined size having the length detected by said detection means when the length of the received image is shorter than the length of the predetermined size minus the preset value or longer than the length of the predetermined size plus the preset value.

4. An image communication apparatus according to claim 1 wherein said setting means can set any length for the predetermined size.

5. An image communication apparatus according to claim 1 wherein said setting means can set a plurality of lengths for the predetermined size.

6. An image communication apparatus according to claim 1 further comprising rolled sheets of a plurality of different sizes wherein the image is recorded on a selected one of the record sheets.

7. A method for recording a received image on a rolled record sheet and cutting the record sheet having the image recorded thereon to a predetermined size, comprising the steps of:
   setting a length for the predetermined size;
   detecting a length of the received image;
   determining whether the length of the received image is longer than a first length equal to the length of the predetermined size minus a preset value or shorter than a second length equal to the length of the predetermined size plus the preset value; and
   cutting the record sheet at the length of the received image when the length of the received image is shorter than said first length or longer than said second length, and cutting the record sheet at the length of the predetermined size when the length of the received image is longer than said first length and shorter than said second length.

8. A method according to claim 7 wherein any length for the predetermined size may be set.

9. A method according to claim 7 wherein a plurality of lengths for the predetermined size may be set.

10. An image communication apparatus comprising:
means for receiving image data;
means for recording the received image on a rolled record sheet line by line;
means for cutting said record sheet;
means for detecting a length of the received image data in a direction perpendicular to the line;
means for setting a length for a predetermined size; and
control means for comparing the length for the predetermined size set by said setting means and the length detected by said detection means, and controlling said cutting means in accordance with the comparison result,
wherein said control means cuts said record sheet to the predetermined size when a distance between the length detected by said detection means and the length for the predetermined size is within a predetermined range, and cuts the record sheet to a nonpredetermined size having the length determined by the length detected by said detection means when the distance between the length detected by said detection means and the length for the predetermined size is out of the predetermined range.

11. An apparatus according to claim 10, wherein said setting means sets the length for the predetermined size in accordance with a manual operation.

12. An image communication apparatus according to claim 10 wherein said setting means can set a plurality of lengths for the predetermined size.

13. An image communication apparatus according to claim 10 further comprising rolled sheets of a plurality of different sizes wherein the image is recorded on a selected one of the record sheets.

* * * * *

UNITED STATES PATENT AND TRADEMARK OFFICE
CERTIFICATE OF CORRECTION

PATENT NO. : 5,257,114
DATED : October 26, 1993
INVENTOR(S) : TAKEHIRO YOSHIDA, ET AL.

It is certified that error appears in the above-identified patent and that said Letters Patent is hereby corrected as shown below:

Drawings:
SHEET 1 OF 8

FIG. 1, Add reference numeral 6a and a lead line to the signal line from the hybrid circuit 6 to the demodulators 18 and 20.

COLUMN 2

Line 3, "be" should read --become--.
   Line 10, "FIGS. 2A1-2A7," should read --FIGS. 2A1-2A2,--.
   Line 49, "Hoffmann)" should read --Huffmann)--.
   Line 66, "A numeral 18" should read --Numeral 18--.

COLUMN 3

Line 15, "Hoffmann)" should read --Huffmann)--.

COLUMN 4

Line 20, "line 440." should read --line 44o.--.
   Line 29, "15.4 the" should read --15.4, the--.
   Line 40, "outline" should read --outlined--.

COLUMN 5

Line 23, "seize B4," should read --size B4,--.

COLUMN 7

Line 35, "recorded. In" should read --recorded. ¶ In--.

UNITED STATES PATENT AND TRADEMARK OFFICE
CERTIFICATE OF CORRECTION

PATENT NO. : 5,257,114
DATED : October 26, 1993
INVENTOR(S) : TAKEHIRO YOSHIDA, ET AL.

It is certified that error appears in the above-identified patent and that said Letters Patent is hereby corrected as shown below:

COLUMN 8

Line 1, "an" should read --and--.
    Line 5, "an" should read --and--.
    Line 8, "liens" should read --lines--.
    Line 42, "si" should read --is--.
    Line 52, "liens" should read --lines--.

COLUMN 9

Line 47, "landed" should read --loaded--.
    Line 53, "subscan" should read --sub-scan--.
    Line 54, "tot he" should read --to the--.

COLUMN 10

Line 15, "results" should read --result,--.

Signed and Sealed this

Nineteenth Day of July, 1994

Attest:

BRUCE LEHMAN

*Attesting Officer*     Commissioner of Patents and Trademarks